United States Patent [19]

Stivers

[11] 4,293,663
[45] Oct. 6, 1981

[54] FLUOROELASTOMER/POLYEPICHLOROHYDRIN ELASTOMER ARTICLES

[75] Inventor: David A. Stivers, St. Paul, Minn.

[73] Assignee: Minnesota Mining and Manufacturing Company, St. Paul, Minn.

[21] Appl. No.: 87,501

[22] Filed: Oct. 23, 1979

[51] Int. Cl.$^3$ .................... C08L 63/00; C08L 27/16; C08L 27/12
[52] U.S. Cl. .................... 525/187; 525/403; 428/413
[58] Field of Search .................... 525/187, 403

[56] References Cited

U.S. PATENT DOCUMENTS

| | | | |
|---|---|---|---|
| 2,807,648 | 9/1957 | Pitt | 260/607 |
| 2,968,649 | 1/1961 | Pailthorp et al. | 260/80.5 |
| 3,051,677 | 4/1962 | Rexford | 260/29.6 |
| 3,158,580 | 11/1964 | Vandenberg | 260/2 |
| 3,158,581 | 11/1964 | Vandenberg | 260/2 |
| 3,318,854 | 5/1967 | Honn et al. | 260/87.7 |
| 3,700,650 | 10/1972 | Hani et al. | 525/187 |
| 3,726,841 | 4/1973 | Mirolli et al. | 525/187 |
| 4,072,734 | 2/1978 | Nakata et al. | 525/187 |
| 4,188,352 | 2/1980 | Suzuki et al. | 525/187 |

FOREIGN PATENT DOCUMENTS 2011924 7/1979 United Kingdom .

OTHER PUBLICATIONS

"Effect of Sour Gasoline on Rubber Hose", A. Nasasian, *Rubber and Plastics News*, Jun. 26, 1978, pp. 14–16.
"Automotive Fuel Permeation Resistance-A Comparison of Elastomeric Materials", J. D. Maclachlam, Passenger Car Meeting, Society of Automotive Engineers, Jun. 1979 (Paper No. 790657).
Research Disclosure vol. 158 (1977), paper No. 15886, p. 86, published by Industrial Opportunities Ltd.
B. F. Goodrich Chemical Co. Product Information Bulletin 6702-SPM.
Hercules Inc. Technical Bulletin ORH-1D.
"Concerning Amines", David Ginsburg, (Pergamon Press, New York, 1967) p. 73.
"Pseudohalo Metal Compounds XVIII", Beck et al. *Chem. Ber*, 100, 2335–2361 (1967).
"Organic Phosphorous Compounds", G. M. Kosoladoff and L. Maier, (Wiley-Interscience, New York, 1972, vol. 2, p. 189.
J. Org. Chem., G. H. Wiegand, et al., vol. 33, pp. 2671–2675 (1968).
J. Org. Chem., K. Ohkubo, et al., vol. 36, pp. 3149–3155 (1971).
"Topics in Sulfur Chemistry", J. P. Marino, (Georg Thieme, Stuttgart, 1976) p. 32.

*Primary Examiner*—Carman J. Seccuro
*Attorney, Agent, or Firm*—Cruzan Alexander; Donald M. Sell; William G. Ewert

[57] ABSTRACT

A gum stock composition comprising fluoropolymer gum, polyepichlorohydrin gum, polyphenol, and organo-onium compound is mixed with acid acceptor to form a curable gum stock, and the latter is shaped and cured to form shaped elastomeric articles.

31 Claims, No Drawings

FLUOROELASTOMER/POLYEPICHLOROHYDRIN ELASTOMER ARTICLES

This invention relates to gum stocks containing fluoropolymer gums and polyepichlorohydrin gums, curable compositions thereof, a method for curing said compositions, and shaped articles of the cured elastomer products thereof.

Currently the most widely used materials for automotive hoses and seals are nitrile elastomers and polyepichlorohydrin elastomers. These elastomers exhibit undesirable permeability to automotive fuels, thereby representing a significant source of hydrocarbon emissions from modern automobiles. Projected hydrocarbon emission standards, both within the United States and abroad, are so stringent that these elastomers are likely to become unacceptable for future automotive fuel system use. In addition, additives and contaminants commonly found in commercial lead-free gasoline tend to attack these elastomers. Recirculating fuel systems (used on most fuel injected automotive engines) are particularly susceptible to the accumulation of organic hydroperoxides within the fuel. These hydroperoxides build up due to the repeated exposure of fuel to hot metal parts within the engine compartment, return of some of that fuel to the fuel tank, followed by re-exposure of the fuel to hot metal parts within the engine compartment, etc. Fuel which has become contaminated with hydroperoxides is frequently referred to as "sour gasoline", see "Effect of Sour Gasoline on Rubber Hose", A. Nasasian, *Rubber and Plastics News*, June 26, 1978, pp. 14–16. Nitrile elastomers tend to excessively crosslink upon extended exposure to sour gasoline, thereby becoming stiff and brittle. Polyepichlorohydrin elastomers tend to revert to their unvulcanized state upon extended exposure to sour gasoline, thereby becoming weak and soft.

In an effort to reduce hydrocarbon emissions and improve the resistance of automotive fuel system hoses and seals to degradation in the presence of lead-free gasoline or sour gasoline, automobile manufacturers have begun to specify the use of fluoroelastomers for fuel system hoses and seals. Fluoroelastomers exhibit outstanding resistance to hydrocarbon permeation and excellent stability in the presence of lead-free fuels. Fluoroelastomers actually have much better performance than is required for automotive use with respect to resistance to hydrocarbon permeation and stability in the presence of lead-free gasoline or sour gasoline. However, fluoroelastomers generally have poorer low temperature properties than currently used nitrile or polyepichlorohydrin elastomers, that is, if temperatures drop, then fluoroelastomers lose their resiliency and become brittle sooner than currently used nitrile or polyepichlorohydrin elastomers. This loss of resiliency at low temperatures can lead to fracture, leakage, or other failure of a hose or seal made from a fluoroelastomer when exposed to cold weather conditions commonly found in the continental United States and elsewhere. In addition, fluoroelastomers are generally much more expensive than commercially available nitrile and polyepichlorohydrin elastomers.

Automobile seal and hose manufacturers have therefore sought to obtain a composition which combines the low hydrocarbon permeability and stability upon exposure to lead-free gasoline or sour gasoline that are characteristics of fluoroelastomers, with the good low temperature properties and low cost that are characteristics of nitrile elastomers and polyepichlorohydrin elastomers. Current research has focused on combinations of various fluoroelastomers (of the polymethylene type having substituent fluoro groups on the polymer chain) with epichlorohydrin/ethylene oxide copolymer (hereinafter referred to by the ASTM designation "ECO"), in preference to combinations of fluoroelastomers with nitrile rubber or with epichlorohydrin homopolymer (hereinafter referred to by the ASTM designation "CO"), since ECO has superior low temperature properties. One commercial approach, meeting some of these goals, is to combine the properties of fluoroelastomer and ECO by blending gums of these two elastomers and then simultaneously curing them. Peroxide cure systems have been reported for blends of a fluoropolymer gum and an olefin-containing epichlorohydrin copolymer gum, see "Automotive Fuel Permeation Resistance—A Comparison of Elastomeric Materials", J. D. MacLachlan, presented to the Passenger Car Meeting, Society of Automotive Engineers, June, 1979 (Paper No. 79 0657). Also, a cure system for blends of a fluoropolymer gum and polyepichlorohydrin gum comprising an acid acceptor, certain tertiary amines, salts of those amines, or certain tertiary phosphines, and a fluorine-containing polyhydroxy compound have been described in U.K. Published Patent Specification No. 2,011,924 A. In addition, blends of fluoropolymer gum with polymers other than polyepichlorohydrin gum have been described, for example, in Research Disclosure Vol. 158 (1977), paper No. 15886, page 86, published by Industrial Opportunities Ltd.

Manufacturers of automotive fuel system hoses and seals have also laminated curable fluoropolymer gum stock and curable ECO gum stock together. For example, fuel lines have been made by forming a thin tube or layer of fluoropolymer and surrounding the inner tube or layer with a thicker outer tube or layer made of ECO. By this method hydrocarbon emissions are lowered and stability in the presence of lead-free gasoline or sour gasoline is improved compared to a hose assembly made entirely of ECO copolymer, and the raw material cost of the hose assembly is reduced compared to an assembly made entirely of fluoroelastomer. However, current laminated fuel line assemblies have required the use of an adhesion-promoting coating (i.e. a primer or adhesive) between the fluoropolymer layer and the ECO layer in order to achieve good bonding and prevent delamination of the hose assembly. The need for an adhesion promoting layer or other surface treatment between layers of these two elastomers adds to the cost of manufacture of laminated articles.

It is an object of the present invention to provide gum stocks, and curable compositions thereof, containing fluoropolymers and polyepichlorohydrin gums. It is also an object of the present invention to provide gum stock compositions which can be cured into elastomers with good resistance to hydrocarbon permeation, good stability in the presence of lead-free gasoline, useful low temperature properties, and moderate cost. It is an additional object of the present invention to provide gum stock compositions which can be cured into elastomers with properties which are intermediate between the properties of cured fluoroelastomers or cured polyepichlorohydrin elastomers separately. It is also an object of the present invention to provide a cure system for fluoropolymer gums and polyepichlorohydrin gums which enables the two gums to be blended, shaped, and then cured. It is a further object of the present invention to provide a cure system for fluoropolymer and polyepichlorohydrin gums which enables the two gums to be separately compounded, formed into desired shapes which are then laid one upon the other, and the layup then cured to produce a laminate without the need for use of an adhesion-promoting coating. Another object is to provide shaped elastomeric articles from said curable compositions, including laminated articles.

The present invention provides a gum stock composition comprising a blend of:

(A) fluoropolymer gum comprising a copolymer of (1) terminally ethylenically unsaturated olefin which has 2 to 4 carbon atoms and can be homopolymerized by emulsion polymerization in the presence of a water soluble free radical catalyst such as $K_2S_2O_8$, and (2) at least one terminally ethylenically unsaturated fluoromonoolefin, each of the doubly bonded chain carbon atoms of said fluoromonoolefin being bonded to at least one fluorine atom substituent and any remaining valence of any chain carbon atoms of said fluoromonoolefin being satisfied by hydrogen, fluorine, chlorine, or bromine, or a fluoroalkyl or fluoroalkoxy radical of 1 to 4 carbon atoms, with at least 10 percent of the chain carbon atoms of said copolymer being —$CH_2$— units, at least 10 percent of the chain carbon atoms of said copolymer being bonded to alkyl or alkoxy radicals with the proviso that only one such radical is bonded to a given carbon atom, and with at least 50 percent of the total number of carbon-bonded moieties in said copolymer being fluorine atoms, but with no chain carbon atom of said copolymer being bonded to more than one chlorine or bromine atom;

(B) polyepichlorohydrin gum, consisting of a homopolymer of epichlorohydrin or a copolymer of epichlorohydrin with one or more other cyclic ethers;

(C) polyphenol compound as a curing agent; and (D) certain organoammonium, organoarsonium, organophosphonium, or organosulfonium compounds as cocuring agents;

which composition in reactive association with an acid acceptor becomes a curable gum stock composition that will, upon exposure to heat, cure into an elastomer. The curable gum stock composition can be extruded or molded into desired shapes, such as hoses, O-rings and gaskets, which are heated to produce elastomeric shaped articles.

Representative olefins which can be copolymerized with fluoromonoolefin to prepare a fluoropolymer copolymer gum (A) include ethylene, propylene, 1-butylene, isobutylene, 1,1-chlorofluoroethylene, butadiene, 2-chlorobutadiene, vinyl ethyl ether, vinyl chloride, vinyl acetate and vinylidene fluoride. Vinylidene fluoride is a preferred olefin. Representative fluoromonoolefins which can be copolymerized with the above olefins include 1-chloro-1,2-difluoroethylene, chlorotrifluoroethylene, 1,2-dichloro-1,2-difluoroethylene, trifluoroethylene, tetrafluoroethylene, 1-hydroperfluoropropane ($CFH=CFCF_3$), hexafluoropropene, 2-chloroperfluoropropene, and fluorinated methylvinylethers (such as $CF_3OCF=CF_2$).

Said fluoropolymer gums and their preparation are known in the art and some of them are commercially available. Preferred fluoropolymer gums are those produced by copolymerizing 65 to 85 mol % vinylidene fluoride and 35 to 15 mol % hexafluoropropene as described in U.S. Pat. Nos. 3,051,677 and 3,318,854 and fluoropolymer gums produced by copolymerizing vinylidene fluoride with 10 to 35 mol% hexafluoropropene, and 15 to 25 mol % tetrafluoroethylene as described in U.S. Pat. No. 2,968,649.

The polyepihalohydrin gum (B) is a solid, predominantly amorphous, high molecular weight (i.e. greater than about 40,000 number average molecular weight) epichlorohydrin homopolymer gum, copolymer gums of epichlorohydrin with other cyclic ethers (for example, ethylene oxide, propylene oxide, 2-butene oxide, ethyl glycidyl ether, and trimethylene oxide), or blends of the above polyepichlorohydrin gums. Generally, useful copolymers will contain at least about 50 mole % epichlorohydrin. Representative polyepichlorohydrin gums useful in this invention are described in U.S. Pat. Nos. 3,158,580, 3,158,581, and 3,726,841. Readily available commercial polymer gums include "Herclor H" epichlorohydrin homopolymer (see Hercules Inc. Technical Bulletin ORH-1D), "Hydrin 100" epichlorohydrin homopolymer (see B. F. Goodrich Chemical Co. Product Information Bulletin 6702-SPM), "Herclor C" epichlorohydrin-ethylene oxide copolymer (see Hercules Inc. Technical Bulletin ORH-1D) and "Hydrin 200" epichlorohydrin-ethylene oxide copolymer (see B. F. Goodrich Chemical Co. Product Information Bulletin 6702-SPM).

Cured epichlorohydrin homopolymer ("CO" homopolymer) and cured fluoropolymers retain useful properties down to approximately the same low temperature. Cured copolymers made from epichlorohydrin and ethylene oxide ("ECO" copolymer) retain useful properties down to lower temperatures, but are not stable to as high a temperature range as are cured CO or cured fluoropolymers. The lower the projected use temperatures of the cured elastomer products of this invention, the greater the amount of ECO gum which should be used relative to the amount of fluoropolymer gum or CO gum. The higher the projected use temperature of the cured product, the greater the amount of fluoropolymer gum or CO gum which should be used relative to the amount of ECO gum.

The polyphenol curing agent (C) can be any aromatic compound with two or more hydroxyl groups directly bonded to aromatic ring-carbon atoms. Preferred compounds include polyhydroxy benzenes, naphthalenes, anthracenes, chromones, xanthones, anthraquinones, and polyphenols of the formula:

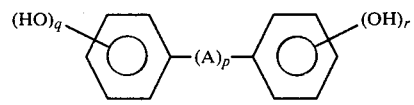

wherein p is 0 or 1; the sum (q+r) is 2 to 4 or more; and A is a thio, oxy, sulfinyl, sulfonyl or carbonyl radical, or a divalent organic radical containing 1 to 13 carbon atoms.

The polyphenol compound (C) can optionally be substituted with moieties which do not interfere with the functioning of the compound as a curing agent. Unsubstituted polyphenol curing agents are preferred. Salts of the above polyphenols or other derivatives which decompose or rearrange into the above polyphenols can be used. Mixtures of more than one of the above polyphenols can be used in this invention.

Representative polyphenols useful in this invention include hydroquinone, 2-methyl hydroquinone, 2,5-dimethyl hydroquinone, 2-t-butyl hydroquinone, resorcinol, 2-methyl resorcinol, 5-methyl resorcinol, 2,4-dibenzoylresorcinol, catechol, 2,4-dihydroxybenzoic acid, 2,4-dihydroxyacetophenone, 1,5-dihydroxynaphthalene, 9,10-dihydroxyanthracene, 1,4,9,10-tetrahydroxyanthracene, 3,6-dihydroxyxanthone, 2,6-dihydroxyanthraquinone, 4,4'-dihydroxydiphenylsulfoxide, 4,4'-dihydroxydiphenylsulfone (Bisphenol S), 1,1-cyclohexylidene-bis(4-hydroxybenzene), 2-chloro-1,4-cyclohexylene-bis(4-hydroxybenzene), 2,2-isopropylidene-bis(4-hydroxybenzene) (Bisphenol A), 2,2-hexafluoroisopropylidene-bis(4-hydroxybenzene) (Bisphenol AF), 2,4'-dihydroxybenzo-phenone, 4,4'-dihydroxybenzophenone, 2,2',4,4'-tetrahydroxybenzophenone, and 2-fluoro-1,4-phenylene-bis(4-hydroxybenzene). Bisphenol S and Bisphenol AF are preferred polyphenols but others may be chosen by those skilled in the art in order to provide selected curing characteristics for particular applications.

The organo-onium cocuring agent (D) is an organoammonium, organoarsonium or organophosphonium compound of the formula $$(R^1)_4 Q^{+1} (X^{-m})_{1/m} \qquad \text{I}$$

or $$(R^1)_3 Q R^2 Q (R^1)_3 {}^{+2} (X^{-m})_{2/m} \qquad \text{II}$$

wherein Q is a nitrogen, arsenic, or phosphorus atom; X is an anion of valence m; each $R^1$ is a monovalent organic radical which is the same as or different from any other $R^1$, can combine with another $R^1$ to form a cyclic structure containing a Q atom, can contain from 1 to about 20 carbon atoms, can have a carbon skeletal chain which is linear, branched or cyclic, and is saturated, unsaturated or aromatic, which chain can contain hetero skeletal atoms other than carbon (e.g. oxygen or sulfur); and $R^2$ is a divalent organic radical containing from 2 to 12 (preferably 2 to 8) carbon atoms.

The organo-onium compound (D) can also be an organosulfonium compound of the formula $$(R^3)_3 S^{+1} (X^{-m})_{1/m} \qquad \text{III}$$

or $$(R^3)_2 S R^4 S (R^3)_2 {}^{+2} (X^{-m})_{2/m} \qquad \text{IV}$$

wherein S is sulfur; X is an anion of valence m; each $R^3$ is a monovalent organic radical which is the same as or different from any other $R^3$, can combine with another $R^3$ to form a cyclic structure containing an S atom, can contain from 1 to about 20 carbon atoms, can have a carbon skeletal chain which is linear, branched, or cyclic, which chain can be saturated, unsaturated or aromatic, can contain hetero skeletal atoms other than carbon (e.g. oxygen or sulfur); $R^4$ is a divalent organic radical having from 2 to 12 (preferably 2 to 8) carbon atoms; and at least one $R^3$ or $R^4$ group is aromatic.

Mixtures of more than one of the above organo-onium cocuring agents can be used in this invention.

In the above organo-onium cocuring agent formulas, suitable anions X include chloride, bromide, sulfate, bisulfate, nitrate, hydroxide, carbonate, perchlorate, trifluoromethane sulfonate, acetate, benzene sulfonate, phenate, tetrafluoroborate, hexachlorophosphate, hexafluorophosphate, hexachlorostannate, hexafluoroarsenate, and hexafluoroantimonate.

In the above formulas, preferably $R^1$ and $R^3$ are alkyl, alkenyl, cycloalkyl, phenyl, or combinations thereof, and $R^2$ and $R^4$ are alkylene, phenylene or combinations thereof, such as phenylenedialkylene, with at least one of the $R^3$ and $R^4$ groups containing an aromatic nucleus with 6 ring-carbon atoms.

The $R^1$, $R^2$, $R^3$, or $R^4$ groups can contain substituents which do not interfere with the function of the compound as a cocuring agent, such as halo, alkoxy, alkylthio, cyano, phenylthio, carboalkoxy, acetoxy, and acetamido. Most preferably $R^1$, $R^2$, $R^3$ and $R^4$ are unsubstituted. In general, organophosphonium compounds are preferred as cocuring agents due to their ready availability.

Representative organo-onium cocuring agent compounds include: $(CH_3)_4 N^+ OH^-$, $(C_4H_9)_4 N^+ Br^-$, $(HOCH_2CH_2)_3 N^+ CH_3 I^-$, $HO^-(C_4H_9)_3 N^+ CH_2CH_2 N^+(C_4H_9)_3 OH^-$, $(C_2H_5)_3(C_6H_5) N^+ Br^-$,

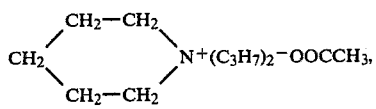

$(C_8H_{17})_3(CH_2{=}CHCH_2) N^+ BF_4^-$,
$(C_4H_9)_3(CF_3CH_2) N^+ (SO_4^{-2})_{\frac{1}{2}}$,

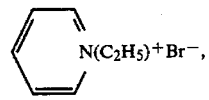

$(CH_3)_4 As^+ OH^-$, $(C_6H_5)_4 As^+ Cl^-$,
$(CH_3)_2(C_2H_5)_2 P^+ Cl^-$, $(C_2H_5)_3(C_{18}H_{37}) P^+ Br^-$,
$(C_3H_7)_3(cyclo\text{-}C_6H_{11}) P^+ OH^-$,
$(C_4H_9)_3(CH_2{=}CHCH_2) P^+ Cl^-$,
$(C_6H_5)_3(C_6H_5CH_2) P^+ Cl^-$,
$(C_6H_5)_3(C_6H_5COCH_2) P^+ Br^-$,
$(C_8H_{17})_3(CH_3OCH_2CH_2) P^+ NO_3^-$,
$Cl^- {}^+(C_6H_5)_3 PCH_2C_6H_4CH_2 P(C_6H_5)_3 {}^+ Cl^-$,

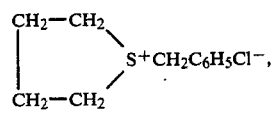

$(C_6H_5)_3 S^+ Cl^-$, $(C_6H_5)_3 S^+ (SO_4^{-2})_{\frac{1}{2}}$, $(C_6H_5)_3 S^+ PF_6^-$, $(C_6H_5)_2(CH_3) S^+ BF_4^-$, diphenylnaphthylsulfonium trifluoromethanesulfonate, tritolylsulfonium nitrate, anisyldiphenylsulfonium hexafluoroantimonate, 4-butoxyphenyldiphenylsulfonium tetrafluoroborate, 4-chlorophenyldiphenylsulfonium acetate, tris(4-phenoxyphenyl)sulfonium hydroxide, di(4-ethoxyphenyl)methylsulfonium hexafluoroarsenate, 4-acetoxy-phenyldiphenylsulfonium carbonate, tris(4-thiomethoxyphenyl)sulfonium hexafluorophosphate, di(methoxysulfonylphenyl)methylsulfonium chloride, di(methoxynaphthyl)methylsulfonium tetrafluoroborate, tris(carbomethoxyphenyl)sulfonium hexafluorophosphate, and 4-acetamidophenyldiphenylsulfonium perchlorate.

Synthetic routes to the above organo-onium compounds are described, for example, in "Concerning Amines", David Ginsburg, (Pergamon Press, New York, 1967) page 73; "Psuedohalo Metal Compounds XVIII", Beck et al, *Chem Ber,* 100, 2335-61 (1967) (arsenic), "Organic Phosphorous Compounds", G. M. Kosolapoff and L. Maier, (Wiley-Interscience, New York, 1972) Vol. 2, page 189; J. Org. Chem., G. H. Wiegand, et al, 33, 2671-75(1968) (sulfur); J. Org. Chem., K. Ohkubo, et al, 36, 3149-55(1971) (sulfur); "Topics in Sulfur Chemistry", J. P. Marino, (Georg Thieme, Stuttgart, 1976) page 32; and U.S. Pat. No. 2,807,648. The teachings of these references are incorporated herein by reference.

Prior to curing, an acid acceptor (preferably an inorganic base) is added to the gum stock to provide a curable gum stock or compound. Suitable acid acceptors include lead-based compounds, calcium hydroxide, and magnesium oxide. Mixtures of more than one acid acceptor can be used in this invention. Preferred acid acceptors are lead-based compounds such as dibasic lead phosphite, dibasic lead phthalate, tribasic lead maleate monohydrate, tribasic lead fumarate, and white lead (PbO).

Other gum stock ingredients commonly used as compounding adjuvants for fluoropolymer and for polyepichlorohydrin gums can also be included in the gum stock prior to curing, such as one or more heat stabilizers (additives which improve retention of physical properties at elevated temperatures such as phenyl-beta-naphthylamine, N,N'-di-beta-naphthyl-p-phenylenediamine, N-isooctyl-p-aminophenol, polymerized 2,2,4-trimethyl-1,2-dihydroquinoline, nickel dibutyldithiocarbamate and nickel dimethyldithiocarbamate), processing aids, lubricants, plasticizers, and fillers (e.g. high surface carbon blacks and amorphous silicas). Organic primary monoamines and polysecondary (e.g. disecondary) amines are preferred heat stabilizers. Blended gum stock compositions of the present invention which contain ECO copolymer preferably contain at least one organic primary monoamine as a heat stabilizer. Suitable organic primary monoamines include octyl amine and octadecyl amine. In general, as the amount of CO or ECO is increased in a blended composition of the present invention, a greater amount of heat stabilizer is needed to maintain the elevated temperature stability of the final cured article. If a cured blended composition of the present invention has a proposed use at temperatures in excess of about 200° C., i.e. if it has a high concentration of fluoroelastomer, then the amount of heat stabilizer used should be held to a minimum consistent with good retention of physical properties after aging. If more than this amount of heat stabilizer is used in such compositions, then the final cured article will actually have decreased stability at elevated temperatures.

The amounts of each component (A), (B), (C), and (D), and any compounding adjuvants used, will depend upon the proposed application and desired cure characteristics. As mentioned above, use of ECO copolymer in a blended composition of the present invention is preferred where improved low temperature properties are of major concern in the final cured article. CO homopolymer should be used in a blended composition of the present invention where improved high temperature properties are more important in the final cured article. Also, as the amount of fluoropolymer gum is increased in a blended composition of the present invention, the stability of that composition at elevated temperatures is improved.

In general, many of the properties of a cured blended composition of the present invention will be intermediate between the physical properties, when cured, of the individual gumstocks used to make the blend composition. In general, a lower concentration of polyphenol curing agent in the gum stock will produce a lower crosslink density and lower modulus in the cured compound, while a higher concentration of polyphenol curing agent will produce higher crosslink density and higher modulus. Low concentrations of organo-onium cocuring agent and acid acceptor will produce slower cures. Suitable concentration ranges for producing a useful cured product are shown below. The term "parts" refers to parts by weight of fluoropolymer gum or polyepichlorohydrin gum. The term "phr" refers to parts per hundred parts of the total weight of fluoropolymer gum plus polyepichlorohydrin gum. The term "mmhr" refers to millimoles per hundred grams of fluoropolymer gum plus polyepichlorohydrin gum.

| Gum Stock Component | Amount | |
|---|---|---|
| fluoropolymer gum | 1 to 99 parts | ⎫ total 100 parts |
| polyepichlorohydrin gum | 99 to 1 parts | ⎭ |
| polyphenol curing agent | 0.3 to 15 mmhr | |
| organo-onium cocuring agent | 0.2 to 7.5 mmhr | |
| acid acceptor | 0.5 to 40 phr | |

Compounding adjuvants may be added in conventional quantities, e.g. heat stabilizers at 0.1 to 20 phr, and preferably at 0.5 to 10 phr.

The addition of conventional amine curing agents (e.g. hexamethylene diamine) ordinarily should be avoided. The presence of such amines tends to slow down the cure rate and degrade the storage life, heat aging and compression set of the compositions of the present invention.

Mixing of the above components and additives can be carried out in any order. For a blended composition of the present invention it may be convenient to mill fluoropolymer gum and polyepichlorohydrin gum together and then mill into this mixture polyphenol curing agent and organo-onium cocuring agent, forming a gum stock. This gum stock will have an extended storage life at room temperature, e.g. one year or more. Prior to curing, the acid acceptor(s) are milled into the gum stock (forming a curable gum stock), after which the room temperature shelf life is more limited, e.g., to a few months. Additives can be milled into the gum stock or the curable gum stock at any time prior to curing.

Variations on the above mixing schemes can be used, e.g. the polyphenol curing agent, organo-onium cocuring agent, and the acid acceptor can be admixed and later combined with either of the polymer gums. Masterbatch techniques can be used in preparing the curable gum stock. For example, a masterbatch may be prepared by combining 100 parts (by weight) of fluoropolymer gum or polyepichlorohydrin gum or a blend of these gums (e.g. 1 to 99 parts fluoropolymer gum with 99 to 1 parts polyepichlorohydrin gum) with about 100 to 900 parts of curing agent, and with about 100 to 900 parts of cocuring agent, and the resulting masterbatch later combined with the requisite balance of fluoropolymer gum or polyepichlorohydrin gum or a blend of these gums to form a gum stock composition. Alternatively, the polyphenol curing agent can be mixed into a carrier (at a concentration of about 100 to 900 parts of curing agent in 100 parts of carrier) to provide a first masterbatch and the organo-onium cocuring agent can be separately mixed into a carrier (at a concentration of about 100 to 900 parts of cocuring agent in 100 parts of carrier) to form a second masterbatch, and the first and second masterbatches later milled into the desired polymer gums in desired proportions to prepare a gum stock, to which acid acceptor is subsequently added to form a curable gum stock. This latter masterbatch technique allows convenient adjustment by the user of the amounts of each component in the gum stock and helps ensure thorough dispersion of the components in the gum stock. In addition, mixing either the polyphenol curing agent or the organo-onium cocuring agent with a carrier reduces the likelihood that hazardous or environmentally deleterious substances will be released into the atmosphere during mixing, since some of these components are in the form of a dusty, powdered solid. Suitable carriers include fluoropolymer gum, polyepichlorohydrin gum, neoprene, chlorosulfonated polyethylene, chlorinated polyethylene, and ethylene-propylene copolymer. Said fluoropolymer gum A (e.g. said 65-85:35-15 mol % vinylidine fluoride:hexafluoropropylene copolymer) and polyepichlorohydrin gum B are the preferred carriers.

Mixing of the gum stock components can be carried out using any of the usual rubber mixing devices, such as Banbury mixers, roll mills, or any other convenient mixing device. It has been found that a two-roll rubber mill equipped with heat exchange means, e.g., cored chambers for cooling, is particularly suitable since the heat generated by the high shearing forces in mixing can be dissipated and the temperature more accurately regulated with this device than with devices providing other means for temperature control. The temperature of the mixture on the mill generally should not be allowed to rise above about 120° C. The mixture should be milled sufficiently to uniformly distribute the cross-linking agents and other ingredients throughout the gum stock. About 5 to 20 minutes or longer is recommended for this process.

After addition of an acid acceptor, the curable gum stock is shaped by molding or extruding and thermally cured (or crosslinked or vulcanized) into a useful elastomeric product. By "elastomeric" is meant the ability of the cured vulcanizate, when slowly stretched at room temperature to at least twice its original length and released, to return rapidly to essentially its original length.

Forming a shaped article such as a gasket by molding typically comprises pressing the curable gum stock in a hot mold, releasing the pressed part from the mold, and (to develop optimum properties) subsequently post curing the part in an oven. The mold can first be coated with a release agent, such as a silicone oil. Molding can be carried out at a temperature between about 95° C. and about 230° C., preferably between about 150° C. and about 205° C., for a period of from about 1 minute to 15 hours, usually from 5 minutes to 30 minutes, and at a pressure of between about 0.7 MPa and about 20.6 MPa, preferably between about 3.4 MPa and about 6.8 MPa. The vulcanized molded article can be post cured at a temperature between about 120° C. and about 230° C., usually at about 150° C. to 200° C., for a period of from about 4 hours to 24 hours or more depending on the cross-sectional thickness of the sample. For thick sections, the temperature during the post cure usually is raised gradually from the lower limit of the range to the desired maximum temperature selected. For thinner sections, e.g., less than 5 mm, the section can be put into the oven at the desired maximum temperature.

Alternatively, the curable gum stock can be shaped by extrusion rather than molding. Extrusion typically comprises heating the curable gum stock to a temperature of about 100° C. and forcing it through a suitable die or orifice at a pressure of between about 330 MPa and about 400 MPa. The shaped extrudate can then be press cured as above, or, alternatively, steam autoclaved at a temperature of between about 135° C. and about 160° C., for a period from about 30 minutes to 4 hours. The vulcanized extruded article can then be post cured in the same manner as a molded article. Laminated products of the present invention may be prepared by co-extruding and simultaneously curing two or more polymer gum stocks, or by separately extruding each gum stock and later laminating the extrudates together for subsequent cure. Laminating may be carried out at a pressure of about 0.3 to 20 MPa and preferably at about 0.5 to 10 MPa.

In another aspect of this invention, shaped layered or laminated articles made of said fluoropolymer gum and said polyepichlorohydrin gum are provided. These gums, taken singly or blended together as described above, can be prepared as curable compositions and shaped as sheets or the like and the shaped parts laid up together, and the layup then subjected to heat and pressure to produce a laminated article without requiring the use of an adhesion-promoting coating between the layers. In one aspect thereof, such an article can comprise a first layer in the form of a sheet, cylinder, or the like. In a first embodiment, said first layer can be a laminate of a first sublayer of curable gum stock (wherein the gum is said fluoropolymer gum component A) disposed adjacent a second sublayer of curable gum stock wherein the gum is said polyepichlorohydrin gum component B. Alternatively, in a second embodiment, said first layer can be a curable gum stock containing the above-described blend of fluoropolymer gum and polyepichlorohydrin gum. In each of said first and second embodiments, one or both sides of said first layer (e.g. one or both faces in the case of a sheet, and the inner and/or outer surfaces in the case of a cylinder) is disposed adjacent one or more of said second layers, each of which second layers is a curable gum stock wherein the gum is said fluoropolymer gum or said polyepichlorohydrin gum, or the gum in said second layer is said blend of fluoropolymer gum and polyepichlorohydrin gum, each second layer being the same as or different from said first layer and any other of said second layer (when present). The resulting layered article, when cured, has a strong layer-to-layer bond formed without the need for an adhesion-promoting coating at the interface between contiguous layers or sublayers.

Thus, if said first layer in the resulting cured article is a laminate of said first sublayer of fluoroelastomer and said second sublayer of polyepichlorohydrin, then the cured article will have two sublayers (within a single first layer) and one or more of said second layers. And if said first layer in the resulting cured article is a blend of fluoroelastomer and polyepichlorohydrin elastomer, then the cured article will have a blended first layer and one or more of said second layers.

In an additional aspect of this invention, shaped layered articles are provided consisting essentially of a layer of curable fluoropolymer gum stock disposed adjacent a layer of curable polyepichlorohydrin gum stock, the resulting article, when cured, having a strong layer-to-layer bond formed without the need for an adhesion-promoting coating at the interface between the elastomeric layers. The resulting article has only two layers, neither of which is a blend.

The curable gum stocks in layers and sublayers of the layered articles described above contain the gums recited above plus polyphenol curing agent, organoonium cocuring agent, acid acceptor, and any optional compounding adjuvants. Layered articles are prepared by mixing a curable gum stock for each layer or sublayer, using mixing techniques as outlined above in the discussion of uniformly blended articles of the present invention. The individual curable gumstocks are then placed into a mold or coextruded, using techniques well known in the art, and then cured as described above in the discussion of uniformly blended articles of the present invention.

Upon curing, the contiguous layers adhere to one another, forming a strong layer-to-layer bond whose strength at the bond line equals or exceeds the strength of the individual layers themselves. The layers are thereby joined without the need for an additional adhesion promoting coating between them. For example, a layered fuel hose assembly may be prepared by extruding a thin-walled cylindrical inner liner of fluoropolymer gum stock, covering that liner with a thick-walled coaxial cylindrical sheath of CO gum stock, and covering that sheath with a thin-walled coaxial cylindrical cover made from a gum stock containing a blend of fluoropolymer and ECO gums. After cure, the resulting hose assembly would have low hydrocarbon permeation due to the inner fluoroelastomer liner layer, good oil and solvent resistance due to the outer fluoroelastomer/ECO elastomer blended cover layer, and moderate cost due to the thick intermediate CO elastomer layer. In cross-section, such a hose assembly would have a hollow core and five concentric annulli or rings of cured elastomer—the three principal elastomer layers mentioned above, plus the two interfaces between contiguous principal layers.

Other laminated articles, such as gaskets, tank lining, and seals, can also be prepared in accordance with this invention.

The present invention provides a compatible cure system for associated fluoropolymer gums and polyepichlorohydrin gums. These gums can be blended together and cured into an elastomer many of whose properties are intermediate the cured properties of the individual gums used to prepare the blend. The present invention also enables the formation of laminated articles containing a plurality of elastomer layers, each of the layers being cured fluoropolymer gum stock, cured polyepichlorohydrin gum stock, or a cured gum stock made from a blend of a fluoropolymer and polyepichlorohydrin gums, with the various layers being adhered to one another as a consequence of the compatible curing system without need for an additional adhesion-promoting primer or adhesive between contiguous layers.

The following examples are offered to aid understanding of the present invention and are not to be construed as limiting the scope thereof. Curing characteristics are reported under the heading "Rheometer". Data were obtained in accordance with ASTM D 2084-75 using a Monsanto Oscillating Disk Rheometer Model MP-V, with a 20 second preheat, a 100 cpm oscillator frequency, and a 3° arc.

Resistance to scorch is reported under the heading "Mooney Scorch". Data were obtained in accordance with ASTM D 1646-74 using a Scott Testing Inc. Mooney Viscometer Model ST1, with a 1 minute preheat and a small rotor at 121° C.

Physical properties of press cured and post cured samples are reported under the headings "Press cure" and "Post cure". Samples were in the form of 150×150×1.8 mm sheets and were pressed at about 5 MPa at the indicated conditions. After measurement of the indicated physical properties, portions of the samples were then post cured in an oven at the indicated conditions, and physical properties re-measured. Measurements were in accordance with ASTM D 412-75 using an Instron Tensile Tester, Method "A", using dumbbell samples cut from 1.8 mm sheet with die "C".

Resistance to heat aging is reported under the heading "Accelerated aging of post cured sample". Data were obtained in accordance with ASTM D 412-75 (as above) and ASTM D 573-72.

Low temperature properties are reported under the heading "Low temperature retraction". Data were obtained in accordance with ASTM D 1329-72, and are reported as the temperature at which a frozen sample retracted 10 percent from a specified elongation.

Resistance to degradation upon exposure to solvents is reported under the heading "Volume swell". Data were obtained in accordance with ASTM D 1460-68, using ASTM #3 oil, as well as Reference Fuel "C" (a 50% aliphatic, 50% aromatic test fuel).

Resistance to compression set is reported under the heading "Compression set, O-rings". Data were obtained in accordance with ASTM D 395-69 (reapproved 1975), Method B using type "1" O-rings with a 3.53 mm cross section, subjected to 25% compression at the indicated conditions.

EXAMPLE 1

In a series of four runs, fluoropolymer gum and epichlorohydrin homopolymer gum were combined with a polyphenol, a tetraorganophosphonium salt, an acid acceptor, a filler, and a heat stabilizer. The ingredients were milled by putting the gum stock on the mill, adding the curing and cocuring agents as a group, adding all other ingredients as a group, and cutting the mixture back and forth until all ingredients were well dispersed. The curable gum stock was then molded and cured as indicated. The mechanical properties of the cured elastomers were determined before and after accelerated aging. Low temperature retraction, volume swell, and compression set data were also obtained. The composition of the curable gum stocks and the above mentioned mechanical properties are set forth in Table I. Comparative data are shown for the unblended gums (Runs 1 and 6).

TABLE I

| Ingredient | Run No. | | | | | |
|---|---|---|---|---|---|---|
| | 1 | 2 | 3 | 4 | 5 | 6 |
| Fluoropolymer gum[a] (parts) | 100 | 76 | 55 | 44 | 29 | |
| Polyepichlorohydrin gum[b] (parts) | | 24 | 45 | 56 | 71 | 100 |
| Bisphenol AF[c] (mmhr) | 6.25 | 6 | 6 | 6 | 6 | 6 |
| $(C_6H_5)_3(C_6H_5CH_2)P^+Cl^-$ (mmhr) | 1.3 | 1.6 | 1.9 | 2 | 2.2 | 2.6 |
| MgO[d] (phr) | 3 | | | | | |
| Ca(OH)$_2$ (phr) | 6 | | | | | |
| Dibasic lead phthalate[e] (phr) | | 6.2 | 12 | 15 | 15 | |

TABLE I-continued

| | | | | | | |
|---|---|---|---|---|---|---|
| Tribasic lead maleate monohydrate[f] (phr) | | | | | | 18 |
| ASTM N-990 carbon black[g] (phr) | 30 | 30 | 30 | 30 | 30 | 30 |
| N,N'-di-beta-naphthyl-p-phenylenediamine[h] (phr) | | 0.7 | 1.3 | 1.6 | 2.1 | |
| Polymerized 2,2,4-trimethyl-1,2-dihydroquinoline[i] (phr) | | | | | | 2.5 |

[a] An 80/20 mole % copolymer of $CF_2=CH_2$ and $CF_3CF=CF_2$
[b] "Hydrin 100", epichlorohydrin homopolymer, commercially available from B. F. Goodrich Chemical Co.
[c] $4,4'-HOC_6H_4C(CF_3)_2C_6H_4OH$
[d] "Maglite D", commercially available from C. P. Hall Co.
[e] "Dythal", commercially available from National Lead Co.
[f] "Trimal", commercially available from National Lead Co.
[g] "Thermax MT", commercially available from Thermatomic Carbon Co.
[h] "Agerite White", commercially available from R. T. Vanderbilt Co.
[i] "Agerite Resin D", commercially available from R. T. Vanderbilt Co.

| | Run No. | | | | | |
|---|---|---|---|---|---|---|
| | 1 | 2 | 3 | 4 | 5 | 6 |
| Properties after press cure (10 min. at 177° C. unless indicated otherwise) and post cure (24 hrs. at 177° C. unless indicated otherwise): | | | | | | |
| Tensile (MPa) | 13.44[a] | 7.31 | 6.48 | 7.00 | 8.10[b] | 12.76 |
| 100% Modulus (MPa) | 6.20[a] | 3.93 | 4.93 | 4.41 | 3.41[b] | 2.62 |
| Elongation at break (%) | 195[a] | 270 | 140 | 180 | 280[b] | 190 |
| Hardness (Shore A-2) | 75[a] | 76 | 77 | 76 | 72[b] | 67 |
| Accelerated aging of post cured sample - tensile (MPa): | | | | | | |
| Time at 177° C. | | | | | | |
| 3 days | 10.69[c] | 8.89 | 6.48 | 8.31 | 6.93 | 5.07 |
| 7 days | * | 7.83 | 5.96 | 7.52 | 4.17 | 4.79 |
| 14 days | * | 6.27 | 4.93 | 5.69 | 3.14 | 2.93 |

[a] Post cured for 24 hrs. at 260° C.
[b] Press cured for 20 min. at 177° C.
[c] Aged at 276° C. (Essentially no change in properties when aged at 177° C.)
*Not run

| | Run No. | | | | | |
|---|---|---|---|---|---|---|
| | 1 | 2 | 3 | 4 | 5 | 6 |
| Accelerated aging of post cured sample - elongation at break (%): | | | | | | |
| Time at 177° C. | | | | | | |
| 3 days | 190[c] | 200 | 125 | 145 | 200 | * |
| 7 days | * | 210 | 125 | 145 | 100 | 90 |
| 14 days | * | 160 | 110 | 115 | 100 | 90 |
| Accelerated aging of post cured sample - hardness (Shore A-2): | | | | | | |
| Time at 177° C. | | | | | | |
| 3 days | 77[c] | 79 | 80 | 80 | 76 | 72 |
| 7 days | * | 80 | 81 | 81 | 74 | 77 |
| 14 days | * | 80 | 82 | 82 | 75 | 74 |
| Low temperature refraction - $TR_{10}$ (°C.): | −17 | * | * | −17 | −18 | −21 |
| Volume swell, 70 hr. immersion (%): | | | | | | |
| ASTM #3 oil at 175° C. | 3 | 2 | 4 | 10 | 17 | 19 |
| Reference Fuel C at 25° C. | 2 | 17 | 24 | 27 | 35 | 45 |
| Compression set, O-rings, 70 hrs. at 150° C. (%) | 10 | 21 | 20 | 36 | 37 | 42 |

[c] Aged at 276° C. (Essentially no change in properties when aged at 177° C.)
*Not run

EXAMPLE 2

In this example fluoropolymer gum and epichlorohydrin/ethylene oxide copolymer gum were combined with a polyphenol, a tetraorganophosphonium salt, a basic lead compound, a filler, and two heat stabilizers. The curable gum stocks were compounded, milled and evaluated as in Example 1. The compositions of the curable gum stocks and mechanical properties are set forth in Table II. Comparative data are shown for the unblended gums (Runs 7 and 10).

TABLE II

| | Run No. | | | |
|---|---|---|---|---|
| Ingredient | 7 | 8 | 9 | 10 |

TABLE II-continued

| | | | | |
|---|---|---|---|---|
| Fluoropolymer gum[a] (parts) | 100 | 44 | 44 | |
| Polyepichlorohydrin gum[b] (parts) | | 56 | 56 | 100 |
| Bisphenol AF (mmhr) | 6.25 | 6 | 6 | 6 |
| $(C_6H_5)_3(C_6H_5CH_2)P^+Cl^-$ (mmhr) | 1.3 | 2 | 2 | 2.6 |
| MgO (phr) | 3 | | | |
| Ca(OH)$_2$ (phr) | 6 | | | |
| PbHPO$_3$ (phr) | | | | 18 |
| Dibasic lead phthalate (phr) | | 15 | | |
| Tribasic lead fumarate[c] (phr) | | | 12 | |
| ASTM N-990 carbon black (phr) | 30 | | | 30 |
| Polymerized 2,2,4-trimethyl-1,2-dihydroquinoline (phr) | | | | 2.5 |
| N,N'-di-beta-naphthyl-p-phenylenediamine (phr) | | 2.5 | 2.5 | |
| Octadecyl amine[d] | | 1.65 | 1.65 | |

[a] An 80/20 mole % copolymer of $CF_2=CH_2$ and $CF_3CF=CF_2$.
[b] "Hydrin 200", a 50/50 mole % copolymer of epichlorohydrin and ethylene oxide, commercially available from B. F. Goodrich Chemical Co.
[c] "Lectro 78", commercially available from National Lead Co.
[d] "Armeen 18D", commercially available from Armour Chemical Co.

| | Run No. | | | |
|---|---|---|---|---|
| | 7 | 8 | 9 | 10 |
| Properties after press cure (20 min. at 177° C. unless indicated otherwise) and post cure (24 hrs at 177° C. unless indicated otherwise): | | | | |
| Tensile (MPa) | 13.44[a] | 5.17 | 2.76 | 3.08 |
| 100% Modulus (MPa) | 6.20[a] | 2.34 | 1.10 | 0.63 |
| Elongation at break (%) | 195[a] | 190 | 300 | 370 |
| Hardness (Shore A-2) | 75[a] | 67 | 58 | 33 |
| Accelerated aging of post cured sample - tensile (MPa): | | | | |
| Time at 177° C. | | | | |
| 3 days | 10.69[a,b] | 3.90 | 1.38 | 1.83 |
| 7 days | * | 2.65 | 0.97 | * |
| 14 days | * | 2.65 | 1.62 | * |
| Accelerated aging of post cured sample - elongation at break (%): | | | | |
| Time at 177° C. | | | | |
| 3 days | 190[a,b] | 110 | 180 | 187 |
| 7 days | * | 80 | 100 | * |
| 14 days | * | 60 | 90 | * |
| Accelerated aging of post cured sample - hardness (Shore A-2): | | | | |
| Time at 177° C. | | | | |
| 3 days | 77[a,b] | 72 | 59 | 32 |
| 7 days | * | 72 | 60 | 19 |
| 14 days | * | 81 | 65 | * |

[a] Press cured for 10 min at 177° C. and post cured for 24 hrs at 260° C.
[b] Aged at 276° C. (Essentially no change in properties when aged at 177° C.)
*Not run

EXAMPLE 3

In a series of five runs, fluoropolymer gum, epichlorohydrin homopolymer gum, and epichlorohydrin/ethylene oxide copolymer gum were combined with a polyphenol, a tetraorganophosphonium salt, a basic lead compound, a filler, and two heat stabilizers. The curable gum stocks were compounded, milled and evaluated as in Example 1. The compositions of the curable gum stock and mechanical properties are set forth below in Table III.

TABLE III

| | Run No. | | | | |
|---|---|---|---|---|---|
| | 11 | 12 | 13 | 14 | 15 |
| Fluoropolymer gum[a] (parts) | 28 | 28 | 28 | 44 | 44 |
| Polyepichlorohydrin gum[b] (parts) | 36 | 36 | 36 | 20 | 20 |
| Polyepichlorohydrin gum[c] (parts) | 36 | 36 | 36 | 36 | 36 |
| Bisphenol AF (mmhr) | 6 | 6 | 6 | 6 | 6 |
| $(C_6H_5)_3(C_6H_5CH_2)P^+Cl^-$ (mmhr) | 2 | 2 | 2 | 2.2 | 2.2 |
| Dibasic lead phthalate (phr) | 15 | | | 15 | |
| PbO (phr) | | 24 | | | |
| Tribasic lead fumarate (phr) | | | 24 | | |
| Tribasic lead maleate | | | | | 12 |

TABLE III-continued

| monohydrate (phr) | | | | | |
|---|---|---|---|---|---|
| ASTM N-990 carbon black (phr) | 30 | 30 | 30 | 30 | 30 |
| N,N'-di-beta-naphthyl p-phenylenediamine (phr) | 2.5 | 2.5 | 2.5 | 2.2 | 2.2 |
| Octadecyl amine (phr) | 0.7 | 0.7 | 0.72 | 0.55 | 0.55 |

[a]An 80/20 mole % copolymer of $CF_2=CH_2$ and $CF_3CF=CF_2$.
[b]"Hydrin 100", epichlorohydrin homopolymer, commercially available from B. F. Goodrich Chemical Co.
[c]"Hydrin 200", a 50/50 mole % copolymer of epichlorohydrin and ethylene oxide, commercially available from B. F. Goodrich Chemical Co.

| | Run No. | | | | |
|---|---|---|---|---|---|
| | 11 | 12 | 13 | 14 | 15 |
| Properties after press cure (20 min at 177° C.) and post cure (24 hrs at 177° C.): | | | | | |
| Tensile (MPa) | 6.17 | 3.79 | 3.52 | 6.55 | 3.48 |
| 100% Modulus (MPa) | 1.90 | 1.34 | 1.34 | 2.86 | 1.34 |
| Elongation at break (%) | 290 | 390 | 350 | 240 | 320 |
| Hardness (Shore A-2) | 66 | 60 | 60 | 69 | 62 |
| Accelerated aging of post cured sample - tensile (MPa): | | | | | |
| Time at 177° C. | | | | | |
| 3 days | 5.38 | 3.52 | 3.24 | 5.24 | 2.96 |
| 7 days | 3.24 | 2.72 | 2.72 | 3.65 | 2.41 |
| 14 days | 2.69 | 2.17 | 2.41 | 3.14 | 2.17 |
| Accelerated aging of post cured sample - elongation at break (%): | | | | | |
| Time at 177° C. | | | | | |
| 3 days | 140 | 200 | 140 | 150 | 300 |
| 7 days | 100 | 100 | 100 | 115 | 160 |
| 14 days | 60 | 80 | 60 | 100 | 100 |
| Accelerated aging of post cured sample - hardness (Shore A-2): | | | | | |
| Time at 177° C. | | | | | |
| 3 days | 74 | 66 | 67 | 74 | 66 |
| 7 days | 74 | 70 | 73 | 73 | 66 |
| 14 days | 79 | 73 | 77 | 75 | 71 |

EXAMPLE 4

A laminated article was prepared by preparing two curable gum stocks (one containing a blend of a fluoropolymer gum and epichlorohydrin copolymer gum, and the other containing epichlorohydrin copolymer gum), extruding the two curable gum stocks into 0.5 cm sheets or layers, I and II, and pressing the sheets against one another in a heated platen press under a pressure of 8 MPa at 160° C. for 30 minutes. The excellent bond strength of the laminated article was demonstrated by pulling the two elastomeric layers apart according to a T-peel test as described in ASTM D-1876, on an Instron tensile tester at 23° C. At a crosshead separation rate of 5 cm/minute the T-peel test value was 6.96 Kg per lineal cm, with failure taking place mainly within the elastomeric layers rather than at the bond surface between them. The compositions of the curable gum stocks used to form the two layers are set forth below in Table IV.

TABLE IV

| Ingredient | Layer I | Layer II |
|---|---|---|
| Fluoropolymer gum[a] (parts) | 75 | |
| Polyepichlorohydrin gum[b] (parts) | 25 | 100 |
| Bisphenol S (mmhr) | 6 | 6 |
| $(C_6H_5)_3(C_6H_5CH_2)P^+Cl^-$ (mmhr) | 2.6 | 2.6 |
| PbHPO₃ (phr) | 4.5 | 18 |
| Ca(OH)₂ (phr) | 4.5 | |
| MgO (phr) | 2.25 | |
| ASTM N-990 carbon black (phr) | 30 | 30 |
| Nickel dibutyldithiocarbamate[c] (phr) | 1 | 1 |
| Nickel dimethyldithiocarbamate[d] (phr) | 1 | 1 |

TABLE IV-continued

| Ingredient | Layer I | Layer II |
|---|---|---|
| $C_8F_{17}SO_2N(C_2H_5)C_2H_4O(C_2H_4O)_2H^e$ (phr) | | 1 |

[a]An 80/20 mole % copolymer of $CF_2=CH_2$ and $CF_3CF=CF_2$.
[b]"Hydrin 200", a 50/50 mole % copolymer of epichlorohydrin and ethylene oxide, commercially available from B. F. Goodrich Chemical Co.
[c]"Butyl Niclate", commercially available from R. T. Vanderbilt Co.
[d]"Methyl Niclate", commercially available from R. T. Vanderbilt Co.
[e]A processing aid.

EXAMPLE 5

A laminated article was prepared from two sheets of curable gum stock, as described in Example 4, one sheet being curable fluoropolymer gum stock (layer I) and the other sheet being curable epichlorohydrin copolymer gum stock (layer II). The bond strength of the resulting laminate was 4.3 kg per lineal cm as measured in the T-peel test described in Example 4. The compositions of the two layers are set forth in Table V.

In a comparative experiment, a sheet of curable fluoropolymer gum stock (layer I) and a sheet of conventional curable epichlorohydrin gum stock (layer III) were pressed together in a heated platen press under a pressure of 8 MPa at 177° C. for 30 minutes. The resulting article had a very weak sheet-to-sheet bond whose strength was not measurable on the Instron tensile tester.

TABLE V

| Ingredient | Layer I | Layer II | Layer III |
|---|---|---|---|
| Fluoropolymer gum[a] (parts) | 100 | | |
| Epichlorohydrin copolymer gum[b] (parts) | | 100 | 100 |
| Bisphenol S (mmhr) | | 6.4 | |
| Bisphenol AF (mmhr) | 4.2 | | |
| $(C_6H_5)_3(C_6H_5CH_2)P^+Cl^-$ (mmhr) | 1.8 | 5.0 | |
| 2-Mercaptoimidazoline[c] (mmhr) | | | 9.8 |
| PbHPO₃ (phr) | | 12 | 12 |
| MgO (phr) | 9 | | |
| ASTM N-990 carbon black (phr) | 15 | | |
| ASTM N-762 carbon black[d] (phr) | 7 | | |
| ASTM N-326 carbon black[e] (phr) | 5 | | |
| ASTM N-550 carbon black[f] (phr) | | 50 | 50 |
| Polymerized 2,2,4-trimethyl-1,2-dihydroquinoline (phr) | | | 2.5 |
| Nickel dibutyldithiocarbamate (phr) | | 1 | |
| Nickel dimethyldithiocarbamate (phr) | | 1 | |
| $C_8F_{17}SO_2N(C_2H_5)C_2H_4O(C_2H_4O)_2H$ (phr) | | 1 | 1 |
| Polyethylene wax[g] (phr) | 1 | | |
| Carnauba wax (phr) | 0.5 | | |
| 4,4'-Dichlorodiphenylsulfone[h] | 1 | | |

[a]An 80/20 mole % copolymer of $CF_2=CH_2$ and $CF_3CF=CF_2$.
[b]"Hydrin 200", a 50/50 mole % copolymer of epichlorohydrin and ethylene oxide, commercially available from B. F. Goodrich Chemical Co.
[c]"NA-22", commercially available from E. I. duPont de Nemours Co.
[d]"Continex N-762", commercially available from Continental Carbon Co.
[e]"Continex N-326", commercially available from Continental Carbon Co.
[f]"Philblack A", commercially available from Philips Chemical Co.
[g]"AC-Polyethylene 6A" processing aid, commercially available from Allied Chemical Co.
[h]A processing aid Various modifications and alterations of this invention will be apparent to those skilled in the art without departing from the scope and spirit of this invention and the latter should not be restricted to that set forth herein for illustrative purposes.

What is claimed is:
1. A gum stock composition, comprising a blend of:
 (a) fluoropolymer gum comprising a copolymer of (1) terminally ethylenically unsaturated olefin which has 2 to 4 carbon atoms and can be homopoly- merized by emulsion polymerization in the presence of a water soluble free radical catalyst such as $K_2S_2O_8$, and (2) at least one terminally unsaturated fluoromonoolefin, each of the doubly bonded chain carbon atoms of said fluoromonoolefin being bonded to at least one fluorine atom substituent and any remaining valence of any chain carbon atom of said fluoromonoolefin being satisfied by hydrogen, fluorine, chlorine, bromine, or a fluoroalkyl or fluoroalkoxy radical of 1 to 4 carbon atoms, with at least 10 percent of the chain carbon atoms of said copolymer being —$CH_2$— units, at least 10 percent of the chain carbon atoms of said copolymer being bonded to alkyl or alkoxy radicals with the proviso that only one such radical is bonded to a given carbon atom, and with at least 50 percent of the total number of carbon-bonded moieties in said copolymer being fluorine, but with no chain carbon atom of said copolymer being bonded to more than one chlorine or bromine atom;

(b) polyepichlorohydrin gum;

(c) polyphenol curing agent; and (d) organo-onium cocuring agent selected from compounds of the formulas

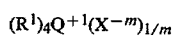

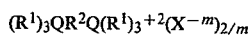

wherein Q is a nitrogen, arsenic or phosphorus atom; X is an anion of valence m; each $R^1$ is a monovalent organic radical containing 1 to 20 carbon atoms, is the same as or different from any other $R^1$, and can combine with another $R^1$ to form a cyclic structure containing a Q atom; and $R^2$ is a divalent organic radical containing 2 to 12 carbon atoms;

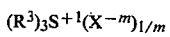

or

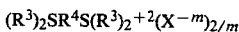

wherein S is sulfur; X is an anion of valence m; each $R^3$ is a monovalent organic radical containing 1 to 20 carbon atoms, is the same as or different from any other $R^3$, and can combine with another $R^3$ to form a cyclic structure containing an S atom; $R^4$ is a divalent organic radical containing 2 to 12 carbon atoms; and at least one $R^3$ or $R^4$ group is aromatic;

which composition in reactive association with an acid acceptor will, upon exposure to heat, cure into an elastomer.

2. A composition according to claim 1, wherein said curing agent is selected from the class consisting of:

(i) polyhydroxy benzenes, naphthalenes, anthracenes, chromones, xanthones, and anthraquinones; and (ii) polyphenols of the formula

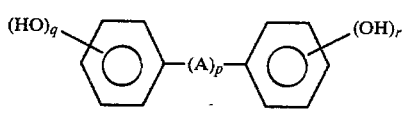

wherein p is 0 or 1; the sum (q+r) is 2 or more; and A is a thio, oxy, sulfinyl, sulfonyl or carbonyl radical or a divalent organic radical containing 1 to 13 carbon atoms.

3. A composition according to claim 1, further comprising heat stabilizer.

4. A composition according to claim 1, wherein said curing agent is Bisphenol S or AF.

5. A composition according to claim 1, further comprising organic primary monoamine and/or polysecondary amine as heat stabilizer.

6. A composition according to claim 1, wherein said cocuring agent is tetraorganophosphonium salt.

7. A composition according to claim 1, wherein said composition contains, per 100 grams of the total weight of said fluoropolymer gum plus said polyepichlorohydrin gum, from about 2.3 to 15 millimoles of said curing agent, and from about 0.2 to 7.5 millimoles of said cocuring agent.

8. A composition according to claim 7, wherein said composition contains, per 100 parts of the total weight of said fluoropolymer gum plus said polyepichlorohydrin gum, from about 0.1 to 20 parts of heat stabilizer.

9. A composition according to claim 8, wherein said fluoropolymer gum is a copolymer of vinylidene fluoride and hexafluoropropene, said polyepichlorohydrin gum is a homopolymer of epichlorohydrin or copolymer of epichlorohydrin and ethylene oxide, said curing agent is Bisphenol S or AF, and said cocuring agent is tetraorganophosphonium salt.

10. A composition according to claim 8, wherein said fluoropolymer gum is a copolymer of vinylidene fluoride and hexafluoropropene, said polyepichlorohydrin gum is a copolymer of epichlorohydrin and ethylene oxide, said curing agent is Bisphenol S or AF, said cocuring agent is tetraorganophosphonium salt, and said heat stabilizer comprises organic primary monoamine.

11. A composition according to claim 8, wherein said fluoropolymer gum is a copolymer of vinylidene fluoride, tetrafluoroethylene, and hexafluoropropene, said polyepichlorohydri gum is a homopolymer of epichlorohydrin or copolymer of epichlorohydrin and ethylene oxide, said curing agent is Bisphenol S or AF, and said cocuring agent is tetraorganophosphonium salt.

12. A composition according to claim 8, wherein said fluoropolymer gum is a copolymer of vinylidene fluoride, tetrafluoroethylene, and hexafluoropropene, said polyepichlorohydrin gum is a copolymer of epichlorohydrin and ethylene oxide, said curing agent is Bisphenol S or AF, said cocuring agent is tetraorganophosphonium salt, and said heat stabilizer comprises organic primary monoamine.

13. A curable gum stock composition comprising:

(a) fluoropolymer gum, consisting essentially of a copolymer of (1) terminally ethylenically unsaturated olefin which has 2 to 4 carbon atoms and can be homopolymerized by emulsion polymerization in the presence of a water soluble free radical catalyst such as $K_2S_2O_8$, and (2) at least one terminally unsaturated fluoromonoolefin, each of the doubly bonded chain carbon atoms of said fluoromonoolefin being bonded to at least one fluorine atom substituent and any remaining valence of any chain carbon atom of said fluoromonoolefin being satisfied by hydrogen, fluorine, chlorine, bromine, or a fluoroalkyl or fluoroalkoxy radical of 1 to 4 carbon atoms, with at least 10 percent of the chain carbon atoms of said copolymer being —$CH_2$— units, at least 10 percent of the chain carbon atoms of said copolymer being bonded to alkyl or akoxy radicals with the proviso that only one such radical is bonded to a given carbon atom, and with at least 50 percent of the total number of carbon-bonded moieties in said copolymer being fluorine, but with no chain carbon atom of said copolymer being bonded to more than one chlorine or bromine atom;
(b) polyepichlorohydrin gum;
(c) polyphenol curing agent;
(d) organo-onium cocuring agent selected from compounds of the formulas

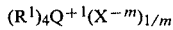

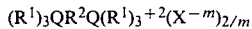

wherein Q is a nitrogen, arsenic or phosphorus atom; X is an anion of valence m; each $R^1$ is a monovalent organic radical containing 1 to 20 carbon atoms, is the same as or different from any other $R^1$, and can combine with another $R^1$ to form a cyclic structure containing a Q atom; and $R^2$ is a divalent organic radical containing 2 to 12 carbon atoms;

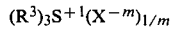

or

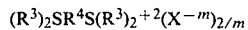

wherein S is sulfur; X is an anion of valence m; each $R^3$ is a monovalent organic radical containing 1 to 20 carbon atoms, is the same as or different from any other $R^3$, and can combine with another $R^3$ to form a cyclic structure containing an S atom; $R^4$ is a divalent organic radical containing 2 to 12 carbon atoms; and at least one $R^3$ or $R^4$ group is aromatic; and
(e) an acid acceptor,
which composition will, upon exposure to heat, cure into an elastomer.

14. A composition according to claim 13, wherein said curing agent is selected from the class consisting of
(a) polyhydroxy benzenes, naphthlenes, anthracenes, chromones, xanthones, and anthraquiones; and
(b) polyphenols of the formula

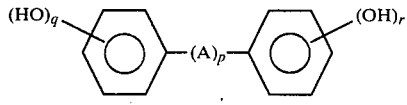

wherein p is 0 or 1; the sum (q+r) is 2 or more; and A is a thio, oxy, sulfinyl, sulfonyl, or carbonyl radical or a divalent organic radical containing 1 to 13 carbon atoms.

15. A composition according to claim 13, further comprising heat stabilizer.

16. A composition according to claim 13, further comprising organic primary monoamine and/or organic polysecondary amine as heat stabilizer.

17. A composition according to claim 13, wherein said curing agent is Bisphenol S or AF.

18. A composition according to claim 13, wherein said cocuring agent is tetraorganophosphonium salt.

19. A composition according to claim 13, wherein said acid acceptor is selected from the class consisting of dibasic lead phosphite, dibasic lead phthalate, tribasic lead maleate monohydrate, tribasic lead fumarate, and white lead.

20. A composition according to claim 19, wherein said composition contains, per 100 grams of the total weight of said fluoropolymer gum plus said polyepichlorohydrin gum, from about 2.3 to 15 millimoles of said curing agent, from about 0.2 to 7.5 millimoles of said cocuring agent, and from about 0.5 to 40 grams of said acid acceptor.

21. A composition according to claim 20, wherein said composition contains, per 100 parts of the total weight of said fluoroelastomer gum plus said polyepichlorohydrin gum, from about 0.1 to 20 parts of heat stabilizer.

22. A composition according to claim 21, wherein said fluoropolymer gum is a copolymer of vinylidene fluoride and perfluoropropene, said polyepichlorohydrin gum is a homopolymer of epichlorohydrin or copolymer of epichlorohydrin and ethylene oxide, said curing agent is Bisphenol S or AF, and said cocuring agent is tetraorganophosphonium salt.

23. A composition according to claim 21, wherein said fluoropolymer gum is a copolymer of vinylidene fluoride and hexafluoropropene, said polyepichlorohydrin gum is a copolymer of epichlorohydrin and ethylene oxide, said curing agent is Bisphenol S or AF, said cocuring agent is tetraorganophosphonium salt, and said heat stabilizer comprises organic primary monoamine.

24. A composition according to claim 21, wherein said fluoropolymer gum is a copolymer of vinylidene fluoride, tetrafluoroethylene, and hexafluoropropene, said polyepichlorohydrin gum is a homopolymer of epichlorohydrin or copolymer of epichlorohydrin and ethylene oxide, said curing agent is Bisphenol S, and said cocuring agent is tetraorganophosphonium salt.

25. A composition according to claim 21, wherein said fluoropolymer gum is a copolymer of vinylidene fluoride, tetrafluoroethylene, and hexafluoropropene, said polyepichlorohydrin gum is a copolymer of epichlorohydrin and ethylene oxide, said curing agent is Bisphenol S or AF, said cocuring agent is tetraorganophosphonium salt, and said heat stabilizer comprises organic primary monoamine.

26. A method comprising the steps of:
(a) blending fluoropolymer gum, polyepichlorohydrin gum, polyphenol curing agent, and organo-onium cocuring agent, said fluoropolymer gum comprising a copolymer of (1) terminally ethylenically unsaturated olefin which has 2 to 4 carbon atoms and can be homopolymerized by emulsion polymerization in the presence of a water soluble free radical catalyst such ad $K_2S_2O_8$, and (2) at least one terminally unsaturated fluoromonoolefin, each of the doubly bonded chain carbon atoms of said fluoromonoolefin being bonded to at least one fluorine atom substituent and any remaining valence of any chain carbon atoms of said fluoromonoolefin being satisfied by hydrogen, fluorine, chlorine, bromine, or a fluoroalkyl or fluoroalkoxy radical of 1 to 4 carbon atoms, with at least 10 percent of the chain carbon atoms of said copolymer being —$CH_2$— units, at least 10 percent of the chain carbon atoms of said copolymer being bonded to alkyl or alkoxy radicals with the proviso that only one such radical is bonded to a given carbon atom, and with at least 50 percent of the total number of carbon-bonded moieties in said copolymer being fluorine, but with no chain carbon atom of said copolymer being bonded to more than one chlorine or bromine atom; said organoonium cocuring agent being selected from compounds of the formulas

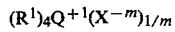

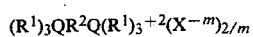

wherein Q is a nitrogen, arsenic or phosphorus atom; X is an anion of valence m; each $R^1$ is a monovalent organic radical containing 1 to 20 carbon atoms, is the same as or different from any other $R^1$, and can combine with another $R^1$ to form a cyclic structure containing a Q atom; and $R^2$ is a divalent organic radical containing 2 to 12 carbon atoms;

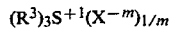

or

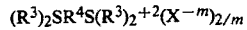

wherein S is sulfur; X is an anion of valence m; each $R^3$ is a monovalent organic radical containing 1 to 20 carbon atoms, is the same as or different from any other $R^3$, and can combine with another $R^3$ to form a cyclic structure containing an S atom; $R^4$ is a divalent organic radical containing 2 to 12 carbon atoms; and at least one $R^3$ or $R^4$ group is aromatic;

(b) admixing the resulting blend with acid acceptor;
(c) shaping the resulting curable gum stock; and
(d) subjecting said shaped gum stock to sufficient heat and pressure to form a vulcanized elastomeric article.

27. A method according to claim 26, wherein said blending step further comprises the addition of a heat stabilizer to said blend.

28. A method according to claim 27, wherein said fluoropolymer gum is a copolymer of vinylidene fluoride and hexafluoropropene, said polyepichlorohydrin gum is a homopolymer of epichlorohydrin or copolymer of epichlorohydrin and ethylene oxide, said curing agent is Bisphenol S or AF, said cocuring agent is tetraorganophosphonium salt, and said acid acceptor is a lead compound.

29. A method according to claim 27, wherein said fluoropolymer gum is a copolymer of vinylidene fluoride and hexafluoropropene, said polyepichlorohydrin gum is a copolymer of epichlorohydrin and ethylene oxide, said curing agent is Bisphenol S or AF, said cocuring agent is tetraorganophosphonium salt, said acid acceptor is a lead compound, and said heat stabilizer comprises organic primary monoamine.

30. A method according to claim 27, wherein said fluoropolymer gum is a copolymer of vinylidene fluoride, tetrafluoroethylene and hexafluoropropene, said polyepichlorohydrin gum is a homopolymer of epichlorohydrin or copolymer of epichlorohydrin and ethylene oxide, said curing agent is Bisphenol S or AF, said cocuring agent is tetraorganophosphonium salt, and said acid acceptor is a lead compound.

31. A method according to claim 27, wherein said fluoropolymer gum is a copolymer of vinylidene fluoride, tetrafluoroethylene and hexafluoropropene, said polyepichlorohydrin gum is a copolymer of epichlorohydrin and ethylene oxide, said curing agent is Bisphenol S or AF, said cocuring agent is tetraorganophosphonium salt, said acid acceptor is a lead compound, and said heat stabilizer comprises organic primary monoamine.

* * * * *

UNITED STATES PATENT AND TRADEMARK OFFICE
CERTIFICATE OF CORRECTION

PATENT NO. : 4,293,663
DATED : October 6, 1981
INVENTOR(S) : David A. Stivers

It is certified that error appears in the above—identified patent and that said Letters Patent is hereby corrected as shown below:

Col. 10, l. 51: "layer" should read -- layers --.

Col. 18, l. 41: "polyepichlorohydri" should read -- polyepichlorohydrin --.

Col. 19, l. 2: "akoxy" should read -- alkoxy --.

Col. 19, l. 46: "naphthlenes" should read -- naphthalenes --.

Col. 19, l. 47: "anthraquiones" should read -- anthraquinones --.

Col. 20, l. 56: "ad" should read -- as --.

Signed and Sealed this

Twenty-third Day of February 1982

[SEAL]

Attest:

GERALD J. MOSSINGHOFF

Attesting Officer     Commissioner of Patents and Trademarks